United States Patent [19]

Gebeke

[11] Patent Number: 4,518,135
[45] Date of Patent: May 21, 1985

[54] SLACK LIMITER FOR A MAGNETIC TAPE CASSETTE

[75] Inventor: Charles D. Gebeke, White Bear Lake, Minn.

[73] Assignee: Minnesota Mining and Manufacturing Company, St. Paul, Minn.

[21] Appl. No.: 520,606

[22] Filed: Aug. 5, 1983

[51] Int. Cl.³ .................... G03B 1/04; G11B 15/32
[52] U.S. Cl. .................................. 242/199; 226/195
[58] Field of Search ............. 242/199, 198, 197, 200, 242/55.19 A; 360/132, 134, 130, 21; 226/195

[56] References Cited

U.S. PATENT DOCUMENTS

| 3,797,779 | 3/1974 | Esashi et al. | 242/199 |
| 4,290,567 | 9/1981 | Saito | 242/198 |
| 4,304,374 | 12/1981 | Okamura et al. | 242/199 |
| 4,342,436 | 8/1982 | Oyama et al. | 242/199 |
| 4,382,565 | 5/1983 | Shiba | 242/199 |
| 4,405,097 | 9/1983 | Gebeke | 242/199 |
| 4,417,704 | 11/1983 | Oishi et al. | 242/199 X |

OTHER PUBLICATIONS

Slack Limiter sketch, Slack limiter manufactured by Matshushita Electric Works, Ltd.

*Primary Examiner*—Stuart S. Levy
*Assistant Examiner*—Leo J. Peters
*Attorney, Agent, or Firm*—Donald M. Sell; James A. Smith; David W. Anderson

[57] ABSTRACT

A cassette includes a slack limiter which engages tape extending from reels within the cassette and prevents the tape from unwinding from the reels and developing slack or looseness. In one embodiment, the slack limiter is formed from a thin, flexible, resilient strip of material which includes a mounting portion formed by folding the strip to produce a compression member extending at an acute angle to the slack limiter. In a second embodiment, the slack limiter includes two oppositely extending strips and a mounting portion formed by two folds and an interconnecting compression member. In either embodiment, the mounting portion of the slack limiter is retained in the housing by a receptacle which compressively engages and bows the compression member.

7 Claims, 6 Drawing Figures

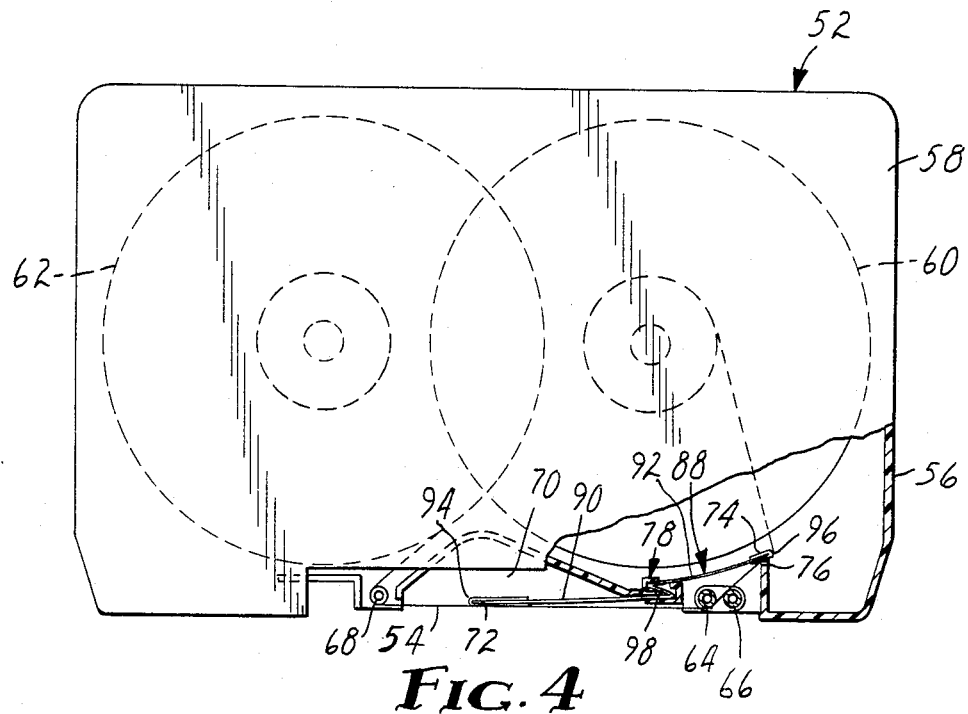
FIG. 4
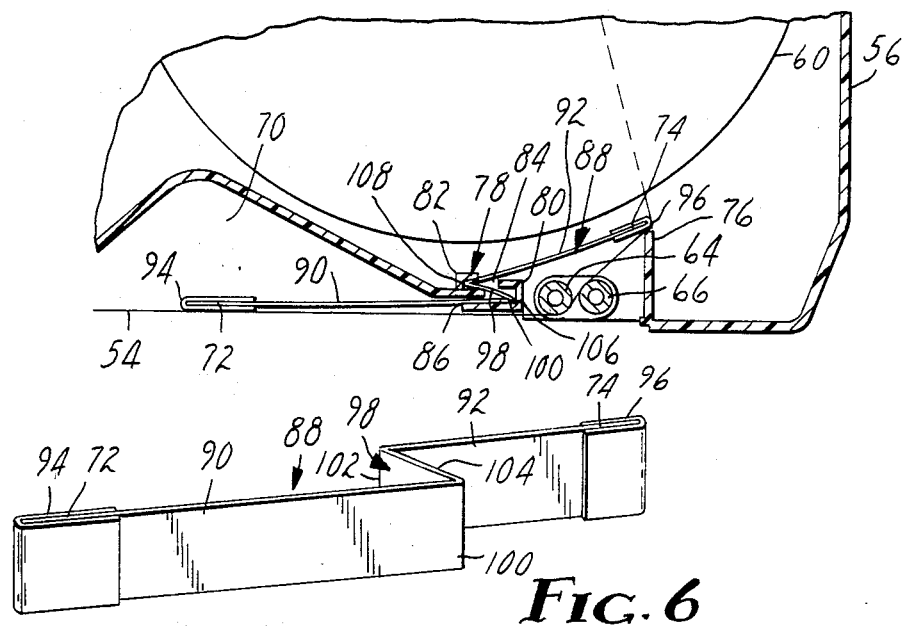
FIG. 5
FIG. 6

SLACK LIMITER FOR A MAGNETIC TAPE CASSETTE

BACKGROUND OF THE INVENTION

1. Field of the Invention

This invention relates generally to cassettes of the type including a length of magnetic tape wound around at least one reel rotatably mounted in a housing with a portion of the tape extending to the exterior of the cassette for engagement by a recording and/or reproducing device and, in particular, a slack limiter for frictionally engaging the tape and limiting looseness or slack in the portion of the tape extending exteriorly of the cassette.

2. Description of the Prior Art

While the subject matter of the invention has general utility with respect to one-quarter inch audio magnetic tape cassettes, one-half inch videotape of either the VHS or Beta formats, and three-quarter inch videotape cassettes, for simplicity the invention will be described with respect to one-half and three-quarter inch magnetic videotape cassettes which include two reels mounted within a housing with a length of magnetic tape wound around the two reels and extending between the reels.

Slack or looseness in the length of tape between the reels in such a cassette can arise when the cassette is being transported or is otherwise separated from its associated recording and/or reproducing device, which device is commonly referred to as a videotape recorder (VTR). While some cassettes have locks which restrict rotation of the reels when the cassette is not in the VTR, it is still possible that one or both of the reels within the cassette housing may turn to unwind the tape and develop slack in the portion of the tape extending between the reels. Slack in the tape can also occur when the tape is engaged with the VTR. Typically, the VTR has spindles which engage the two reels. If driving and braking of the reels during the operation of the VTR is not synchronous, slack in the tape will develop. This slack may cause the tape to jam within the cassette housing or within the VTR and may lead to defective recording or reproducing operations.

So-called slack limiters for avoiding such slack or looseness of the magnetic tape have been disclosed in U.S. Pat. Nos. 3,797,779; 4,290,567; and 4,342,436 in which the slack limiters described commonly include a resilient, flexible strip, usually of plastic, affixed at one end to the cassette housing and having a free end coated with a layer of low friction material such as poolytetrafluoroethylene (Teflon). The free end of the slack limiter presses the magnetic tape against a stationary portion of the cassette housing and thus frictionally prevents the magnetic tape from unwinding from the reel and developing slack. In addition, as described in U.S. Pat. No. 4,342,436, the slack limiter may be double-ended, in which case a second free end of the slack limiter biases the magnetic tape outwardly from the cassette housing while the first free end performs the function described above.

The foregoing patents are distinguished by the manner in which the slack limiter is attached to the cassette housing. In U.S. Pat. No. 3,797,779, the slack limiter is affixed to the cassette housing with an adhesive. This method of attachment is relatively inefficient since the adhesive may deteriorate with age and eventually give way, allowing the slack limiter to fall from or within the cassette housing. Further, manufacturing costs are high because a number of steps are required for assembly and it is very difficult to automatically mount a slack limiter which is retained adhesively.

Alternatively, U.S. Pat. Nos. 4,290,567 and 4,342,436 disclose methods for mechanically attaching the slack limiter to the cassette housing in which a notch or slot formed in the slack limiter is engaged by a projection located within a receptacle formed in the housing. These methods have proven effective in retaining the slack limiter within the cassette housing, but a tolerance must be provided between the notch or slot and the housing projection, so movement of the slack limiter with respect to the cassette housing and the magnetic tape is likely. This movement of the slack limiter may result in less than full contact between the slack limiter and the magnetic tape, detrimental contact between a sharp edge of the slack limiter and the tape, or mistracking of the tape through the cassette.

With respect to the slack limiter itself, it is a continuing goal to reduce manufacturing costs by reducing the number of operations which must be performed to produce the slack limiter and reducing the precision with which the slack limiter must be constructed without sacrificing precise positioning of the slack limiter within the cassette housing.

SUMMARY OF THE INVENTION

The present invention provides an improved cassette having a slack limiter which is economically manufactured, which can be rapidly installed and properly positioned within a receptacle formed in the cassette, and which will absorb any tolerances between the receptacle and the slack limiter after installation.

According to a first embodiment of the present invention, there is provided a flexible, resilient slack limiter including a tab portion terminating in a contact end coated with a low friction material adapted to frictionally engage a magnetic tape in a cassette of the type described above, and a mounting portion opposite the contact end which includes a fold and a compression member extending from the fold at an acute angle to the tab. The cassette housing includes a receptacle which compressively engages the compression member of the slack limiter and causes the compression member to bend or bow. The resiliency of the bowed compression member absorbs any tolerances between the compression member and the receptacle and accurately locates and positively retains the compression member with respect to the receptacle.

According to a second embodiment of the present invention, there is provided a flexible, resilient slack limiter having two tab portions terminating in contact ends coated with a low friction material adapted to frictionally engage and bias the tape in a direction perpendicular to the extension of the tabs, and a mounting portion between the contact ends which includes two folds and an interconnecting compression member forming acute angles with the tabs. Opposite corners of a receptacle formed within the cassette housing engage the folds and cause the compression member to bend between the folds and resiliently bias the mounting portion of the slack limiter into position with respect to the housing receptacle.

BRIEF DESCRIPTION OF THE DRAWINGS

The present invention will be more thoroughly described with reference to the accompanying drawings wherein like numbers refer to like parts in the several views, and wherein:

FIG. 4 is a plan view of a cassette having portions broken away to show details and a second embodiment of a slack limiter according to the present invention;

FIG. 5 is an enlarged plan view of the lower, right-hand portion of the cassette of FIG. 4; and FIG. 6 is a perspective view of the slack limiter used in the cassette of FIG. 4.

DESCRIPTION OF THE PREFERRED EMBODIMENT

Figure 1:
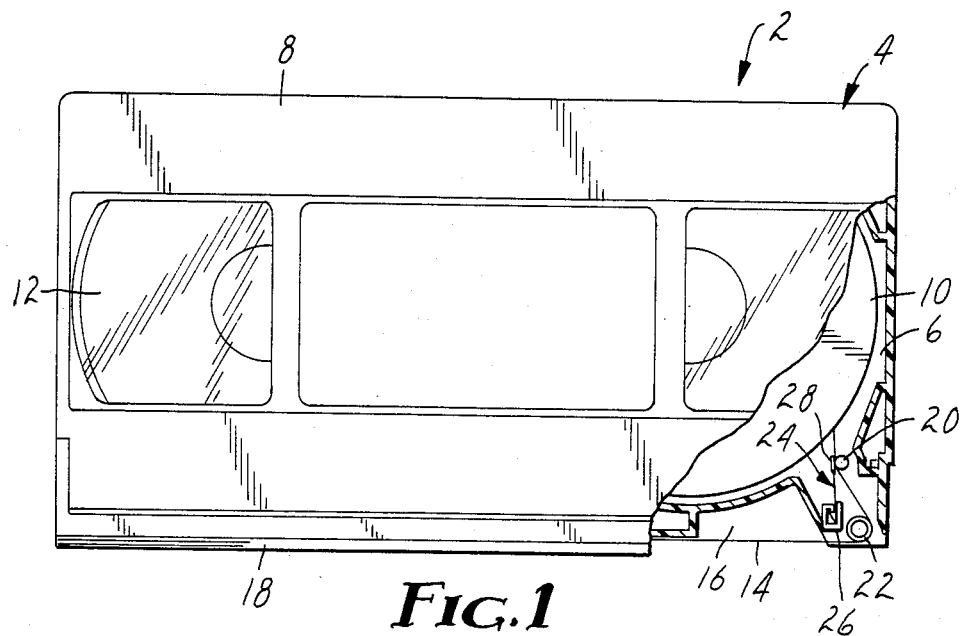
FIG. 1 is a plan view of a cassette having parts broken away to show details and a first embodiment of a slack limiter and mounting receptacle according to the present invention.

Referring to FIG. 1 of the drawings, there is illustrated a cassette 2 which comprises a housing 4 including a lower molded side wall assembly 6 and a mating upper molded side wall assembly 8, two reels 10 and 12 rotatably mounted between the side wall assemblies 6 and 8, and a length of tape 14 having opposite end portions wound around the reels 10 and 12 and a portion extending therebetween. The molded side wall assemblies 6 and 8 define a tape access area 16 along the outer surface of the housing 4 which is covered by a door 18 when the cassette 2 is not in use. The door 18 is pivoted open by a videotape recording machine (VTR) in which the cassette 2 is mounted to afford access to the tape 14 extending across the access area 16. Guide means including two cylindrical guide pins 20 and 22 direct the portion of the tape 14 between the reels 10 and 12 along a tortuous path to the access area 16.

Figure 2:
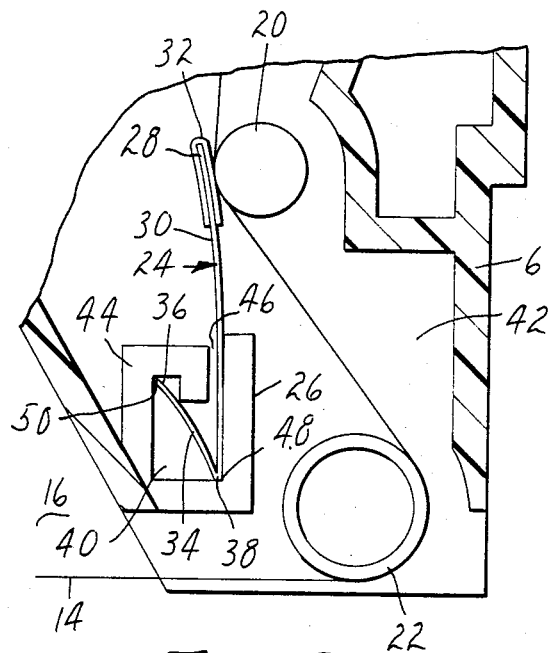
FIG. 2 is an enlarged plan view of the lower, right-hand portion of the cassette of FIG. 1.

As best seen in FIG. 2, a slack limiter 24 is mounted within a molded receptacle 26 formed in the lower side wall assembly 6 with a contact end portion 28 of the slack limiter 24 biased to transversely, frictionally engage the tape 14 and press the tape 14 against a support surface provided by the guide pin 20 to resist unwinding of the tape 14 from the reel 10 and thus limit looseness or slack in the tape 14 extending between the reels 10 and 12.

Figure 3:
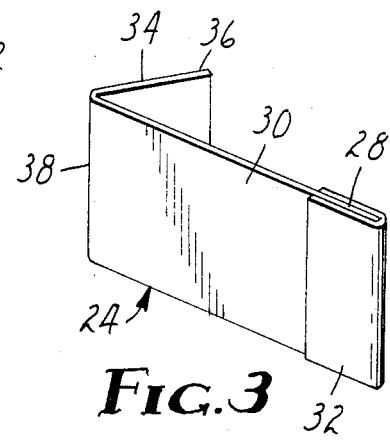
FIG. 3 is a perspective view of the slack limiter used in the cassette of FIG. 1.

Referring to FIG. 3, the slack limiter 24 includes a thin, elongated tab portion 30 of a flexible, resilient polymeric material, which may be 0.004 inches (0.10 mm) thick polyester, having a sheet 32 of polymeric material, which may be 0.0035 inches (0.09 mm) thick polytetrafluoroethylene (Teflon), wrapped and adhered around one end to define the contact end portion 28, and an opposite end defining a mounting portion 34. The mounting portion 34 includes a compression member 36 and a sharp fold 38 which is formed by bending and creasing the material comprising the slack limiter 24. The compression member 36 is thus an extension of the tab 30 and is oriented at an acute angle with respect to the tab portion 30.

Referring back to FIG. 2, the receptacle 26 includes a bottom surface 40 which is a part of the major flat surface 42 of the lower side wall assembly 6 and a wall 44 which extends perpendicularly from the bottom surface 40 to form a generally rectangular enclosure. The receptacle wall 44 includes an opening 46 through which the tab portion 30 of the slack limiter 24 extends. The receptacle 26 includes opposite interior corners 48 and 50 which compressively engage the compression member 36 and thus cause the compression member 36 to be bent or bowed between the corners 48 and 50. The resiliency of the material comprising the compression member 36 forces the fold 38 into positive engagement with the corner 48 and absorbs any tolerance between the length of the compression member 36 and the distance between the corners 48 and 50. The bow formed in the compression member 36 and the resiliency of the material also serves to absorb any plastic creep which may occur as the slack limiter 24 ages.

The length of the compression member 36 may vary over a large range and still operate to force the fold 38 into the corner 48, and so the total length of the material used to form the slack limiter 24 need not be calculated or cut with precision during manufacture. It is only required that the fold 38 be located precisely with respect to the contact end 28 to ensure that the contact end 28 is properly located. Accurate positioning of the fold 38 is easily accomplished during production and so the slack limiter 24 can be economically produced.

Insertion of the slack limiter 24 into the receptacle 26 can be easily and economically achieved by automated means because the compression member 36 can be bowed more than is necessary to engage the corners 48 and 50 to provide a generous tolerance between the compression member 36 and the receptacle 26. After insertion, the compression member 36 will resiliently expand to contact the corners 48 and 50 and thus is self-seating within the receptacle 26 and will absorb the tolerance provided during assembly by excessively bowing the compression member 36.

The cassette 2 described above and illustrated in FIG. 1 is of the so-called VHS format in which a one-half inch tape 14 is employed. FIG. 4 illustrates a cassette 52 which is commonly referred to as a U-Matic format cassette which utilizes a three-quarter inch width tape 54. Construction of the cassette 52 is similar to that of the cassette 2 of FIG. 1 with the U-Matic cassette 52 including a lower side wall assembly 56, an uppe side wall assembly 58, two reels 60 and 62 around which the tape 54 is wound, and guide pins 64, 66 and 68 which guide the tape 54 across an access area 70. However, the U-Matic cassette 52 differs from the VHS cassette 2 in that a second contact end 72 is required to bias the tape 54 outwardly toward its associated VTR in addition to a first contact end 74 which operates as described above to frictionally engage the tape 54 and press the tape 54 against a support 76.

As shown in FIG. 5, two contact ends 72 and 74 are provided by molding a receptacle 78 which inlcudes two walls 80 and 82 which are separated to provide two openings 84 and 86 which accommodate opposite extensions of a slack limiter 88 formed as illustrated in FIG. 6. The slack limiter 88 is comprised of a first tab portion 90 and a second tab portion 92, both of which terminate in contact ends 72 and 74 around which are wrapped polytetrafluoroethylene sheets 94 and 96. Between the contact ends 72 and 74 is located a mounting portion, generally indicated as 98, which includes two folds 100 and 102 formed in the body of the slack limiter 88 which are interconnected by a compression member 104 which forms acute angles with the tab portions 90 and 92.

Referring again to FIG. 5, the slack limiter 88 is inserted in the receptacle 78 between corners 106 and 108 formed by the walls 80 and 82. Thus, although the slack limiter 88 of FIG. 5 is double ended, the mounting portion 98 operates as described with respect to the slack limiter 24 of FIG. 3 to retain and accurately position the slack limiter 88 within the receptacle 78. Excessive bowing of the compression member 104 allows easy insertion of the slack limiter 88 into the receptacle 78 and the resiliency of the compression member 104 causes the folds 100 and 102 to self-seat within the corners 106 and 108 and allows a large difference between the length of the compression member 104 and the distance between the corners 106 and 108 to be absorbed. Thus, even though the slack limiter 88 of FIG. 6 is double ended rather than single ended, the slack limiter 88 retains the advantages described above with respect to the slack limiter 24 of FIG. 3 and additionally biases the tape 54 outwardly away from the cassette 52.

Although the present invention has been described with respect to certain specific embodiments, it will be apparent to those skilled in the art that modifications to the described embodiments are possible. For example, the receptacles need not be rectangular in shape so long as corners are provided to contain and engage the compression members. It is intended that the invention include all modifications falling within the scope of the appended claims.

I claim:

1. In a cassette including a housing, an access opening, at least one reel and a length of tape wound upon the reel and extending across the access opening, the improvement comprising:

a slack limiter of a thin, flexible, resilient material including an elongate tab portion terminating in a contact end adapted to engage the tape and bias the tape in a direction transverse to the elongation of said tab and a mounting portion spaced from said contact end and including a fold and a compression member extending from said fold at an acute angle to said tab portion; and means for mounting said slack limiter to said housing including walls parallel to said fold which engage said fold and the end of said compression member opposite said fold and compress said compression member into a bowed configuration so that the resiliency of said compression member forces said fold and said opposite end of said compression member against said walls.

2. A cassette according to claim 1 wherein said slack limiter further includes a reduced friction layer between said contact end and said tape.

3. A cassette according to claim 1 wherein said means for mounting further includes angled corners which engage said fold and said opposite end of said compression member.

4. A cassette according to claim 1 wherein said slack limiter includes two tab portions extending in substantially opposite directions and terminating in contact ends adapted to engage the tape and wherein said mounting portion includes two folds and an interconnecting compression member forming acute angles with each of said tab portions.

5. A cassette according to claim 4 wherein said means for mounting comprises walls parallel to said folds which engage said folds and compress said compression member into a bowed configuration so that the resiliency of said compression member forces said folds against said walls.

6. A cassette according to claim 5 wherein said means for mounting further includes angled corners which engage said folds.

7. A cassette according to claim 4 wherein said slack limiter further includes reduced friction layers between said contact ends and said tape.

* * * * *